United States Patent
Rao (10) Patent No.: US 8,352,718 B1
(45) Date of Patent: Jan. 8, 2013

(54) METHOD, SYSTEM, AND COMPUTER-READABLE MEDIUM FOR EXPEDITING INITIALIZATION OF COMPUTING SYSTEMS

(75) Inventor: Srinivasan N. Rao, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 197 days.

(21) Appl. No.: 12/501,585

(22) Filed: Jul. 13, 2009

Related U.S. Application Data (62) Division of application No. 11/288,484, filed on Nov. 29, 2005, now abandoned.

(51) Int. Cl.
  *G06F 15/177* (2006.01)
  *G06F 9/00* (2006.01)
(52) U.S. Cl. .................. 713/2; 713/1; 711/118
(58) Field of Classification Search ........... 713/1, 2; 711/118
  See application file for complete search history.

(56) References Cited

U.S. PATENT DOCUMENTS

| | | | |
|---|---|---|---|
| 5,809,531 A | 9/1998 | Brabandt | |
| 6,260,119 B1* | 7/2001 | Garney et al. | 711/150 |
| 6,662,267 B2* | 12/2003 | Stewart | 711/113 |
| 6,920,533 B2 | 7/2005 | Coulson et al. | |
| 7,093,120 B2 | 8/2006 | Keohane et al. | |
| 7,139,909 B2 | 11/2006 | Lee | |
| 7,149,890 B2 | 12/2006 | Justen | |
| 7,181,608 B2* | 2/2007 | Fallon et al. | 713/2 |
| 7,254,676 B2 | 8/2007 | Datta et al. | |
| 7,370,186 B1* | 5/2008 | Lilliebjerg | 713/1 |
| 7,469,335 B2* | 12/2008 | Chu et al. | 713/2 |
| 7,493,460 B2* | 2/2009 | Zimmer et al. | 711/166 |
| 8,103,862 B2* | 1/2012 | Rangarajan et al. | 713/1 |
| 2002/0069354 A1* | 6/2002 | Fallon et al. | 713/2 |
| 2002/0156970 A1* | 10/2002 | Stewart | 711/113 |
| 2003/0084239 A1* | 5/2003 | Stewart | 711/113 |
| 2003/0135729 A1* | 7/2003 | Mason et al. | 713/2 |
| 2003/0142561 A1* | 7/2003 | Mason et al. | 365/200 |
| 2003/0188173 A1 | 10/2003 | Zimmer et al. | |
| 2003/0233533 A1 | 12/2003 | Avraham | |
| 2004/0030877 A1* | 2/2004 | Frid | 713/1 |
| 2004/0098575 A1* | 5/2004 | Datta et al. | 713/2 |

(Continued)

OTHER PUBLICATIONS

U.S. Official Action dated Apr. 14, 2008 in U.S. Appl. No. 11/288,484.

(Continued)

*Primary Examiner* — Jaweed A Abbaszadeh
(74) *Attorney, Agent, or Firm* — Hope Baldauff Hartman, LLC

(57) ABSTRACT

A method, system, and computer-readable medium for expediting initialization of a computing system are provided. According to one aspect of the invention, a computer-readable medium is provided having computer executable instructions stored thereon, which when executed by a computer, cause the computer to cache a portion of a firmware to a cache prior to initialization of a main memory. In particular, the computer-executable instructions cause the central processing unit of the computer to cache a range of memory addresses corresponding to the location of the portion of the firmware stored in a computer storage media to the cache prior to the initialization of the main memory. The firmware may be a BIOS and/or EFI firmware. The computer-executable instructions then cause the computer to execute the portion of the firmware from the cache until the main memory is initialized. The portion of the firmware cached to the cache and executed form the cache until the main memory is initialized may be a boot block portion of the firmware that performs a Power-On Self Test.

18 Claims, 9 Drawing Sheets

U.S. PATENT DOCUMENTS

| | | | |
|---|---|---|---|
| 2004/0103272 A1* | 5/2004 | Zimmer et al. | 713/1 |
| 2004/0243796 A1 | 12/2004 | Keohane et al. | |
| 2005/0086464 A1* | 4/2005 | Lee | 713/100 |
| 2005/0172113 A1 | 8/2005 | Lee | |
| 2006/0020758 A1 | 1/2006 | Wheeler et al. | |
| 2006/0129789 A1 | 6/2006 | Chu et al. | |
| 2007/0038850 A1 | 2/2007 | Matthews et al. | |
| 2007/0055856 A1* | 3/2007 | Zimmer et al. | 713/2 |

OTHER PUBLICATIONS

U.S. Official Action dated Oct. 17, 2008 in U.S. Appl. No. 11/288,484.

U.S. Official Action dated Apr. 1, 2009 in U.S. Appl. No. 11/288,484.

Intel Corporation, "Extensible Firmware Interface Specification—Version 1.10," Dec. 1, 2002, 1084 pages.

Intel Corporation, "Extensible Firmware Interface Specification, Version 1.10, Specification Update," Nov. 26, 2003, 63 pages.

* cited by examiner

METHOD, SYSTEM, AND COMPUTER-READABLE MEDIUM FOR EXPEDITING INITIALIZATION OF COMPUTING SYSTEMS

CROSS-REFERENCE TO RELATED APPLICATIONS

This patent application is a division of U.S. patent application Ser. No. 11/288,484, entitled "Method, System, and Computer-Readable Medium for Expediting Initialization of Computing Systems," filed Nov. 29, 2005 now abandoned, which is expressly incorporated herein by reference in its entirety.

TECHNICAL FIELD

The present invention is related to the field of initialization of a computing system. More particularly, the present invention is related to the field of utilizing a cache associated with a processor of the computer system to expedite initialization.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

In many computing systems, low level instruction code is used as an intermediary between the hardware components of the computing system and the operating software and other high level software executing on the computing system. In some computing systems, this firmware is known as the Basic Input/Output System ("BIOS"). The BIOS provides a set of software routines that allow high level software to interact with the hardware components of the computing system using standard calls.

Because of limitations of the BIOS utilized in many PC-compatible computers, a new specification for the firmware that is responsible for booting the computer and for intermediating the communication between the operating system and the hardware has been proposed. The new specification is called the Extensible Firmware Interface ("EFI") specification and is available from INTEL CORPORATION.

Both types of firmware perform important functions in the operation of computing systems. In particular, the firmware includes routines for performing the Power-On Self Test ("POST"), which executes automatically each time the computing system is powered on. During the POST, the firmware tests various system components such as the system main memory, the disk drives, and the keyboard to determine whether they are properly connected and operating before the firmware begins the actual boot of the system.

One deficiency of current computing systems is the large amount of time the computing systems take to initialize or boot once powered on. Many users view this delay in gaining access to the computing system as an annoyance. One cause of this delay is the amount of time the firmware takes to execute the POST routines. The firmware of most computing systems is stored in read-only memory ("ROM") or flash memory so that the firmware is maintained in the memory when the computing system is powered off and can be executed when the computing system is powered on. When the computing system is powered on, the POST routines of the firmware are executed from the ROM or flash memory. However, the access time for such storage devices is slow in comparison to the speed at which a system processor can execute instructions stored thereon. After the main memory of the computing system is initialized, the firmware may be copied to the main memory, which generally has a faster access time in comparison to ROM or flash memory. In conventional computing systems, the firmware executes from the slower ROM or flash memory until the faster system main memory is initialized. Therefore, there is a need to reduce the execution time of the firmware before the firmware is copied to and executed from the system main memory.

SUMMARY OF THE INVENTION

In accordance with the present invention, the above and other problems are solved by providing a method, computer-readable medium, and apparatus for expediting initialization of a computing system. Through the embodiments of the invention, initialization of a computing system can be expedited by utilizing a cache associated with the computing system.

According to one aspect of the invention, a computer-readable medium is provided having computer executable instructions stored thereon, which when executed by a computer, cause the computer to cache a portion of a firmware to a cache prior to initialization of a main memory. In particular, the computer-executable instructions cause the central processing unit ("CPU") of the computer to cache a range of memory addresses corresponding to the location of the portion of the firmware stored on a computer storage media to the cache prior to the initialization of the main memory. The firmware may be a BIOS and/or EFI firmware. The computer-executable instructions then cause the computer to execute the portion of the firmware from the cache until the main memory is initialized. The portion of the firmware cached to the cache and executed form the cache until the main memory is initialized may be a boot block portion of the firmware that performs a Power-On Self Test ("POST").

The computer-executable instructions are also operative to cause the computer to copy the firmware to the main memory when the main memory is initialized. According to embodiments, once the firmware is copied to the main memory, the computer-executable instructions are operative to cause the computer to cache the firmware copied to the main memory to the cache. In particular, after the firmware is copied to the main memory, the computer-executable instructions cause the CPU to cache a range of memory addresses corresponding to the firmware copied to the main memory to the cache. The computer-executable instructions then cause the CPU to execute the firmware from the cache.

According to other aspects of the invention, a computer system is provided that is operable to expedite initialization of a computer system. The computer system includes a CPU operative to cache a range of memory addresses associated with a portion of a firmware stored in a memory to a cache prior to initialization of a main memory. The firmware may be a BIOS and/or a EFI firmware. The CPU is further operative to execute the portion of the firmware from the cache until the main memory is initialized. The portion of the firmware cached to the cache and executed from the cache by the CPU may be a boot block portion from performing the POST. The computer system also includes the memory where the firmware is stored and the main memory.

When the main memory is initialized, the firmware is operative to copy the firmware stored in the memory to the main memory. According to embodiments, once the firmware is copied to the main memory, the CPU of the computer system is further operative to cache a range of memory addresses associated with the firmware copied to the main memory to the cache. The CPU is then operative to execute the copied firmware from the cache.

According to other aspects of the invention, a computer-readable medium is provided having computer executable instructions stored thereon, which when executed by a computer, cause the computer to cache a portion of instructions from a memory to a cache associated with a first device. In particular, the computer-executable instructions cause the first device of the computer to read ahead instructions from the memory and cache the instructions to the cache associated with the first device. The first device may be a central processing unit. The computer-executable instructions then cause the computer to access the instructions from the memory with a second device. While the second device is accessing the instructions from the memory, the computer-executable instructions cause the computer to access the cached portion of the instructions from the cache with the first device. The second device may be an embedded controller.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide methods, systems, apparatus, and computer-readable medium for expediting initialization of computing systems. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
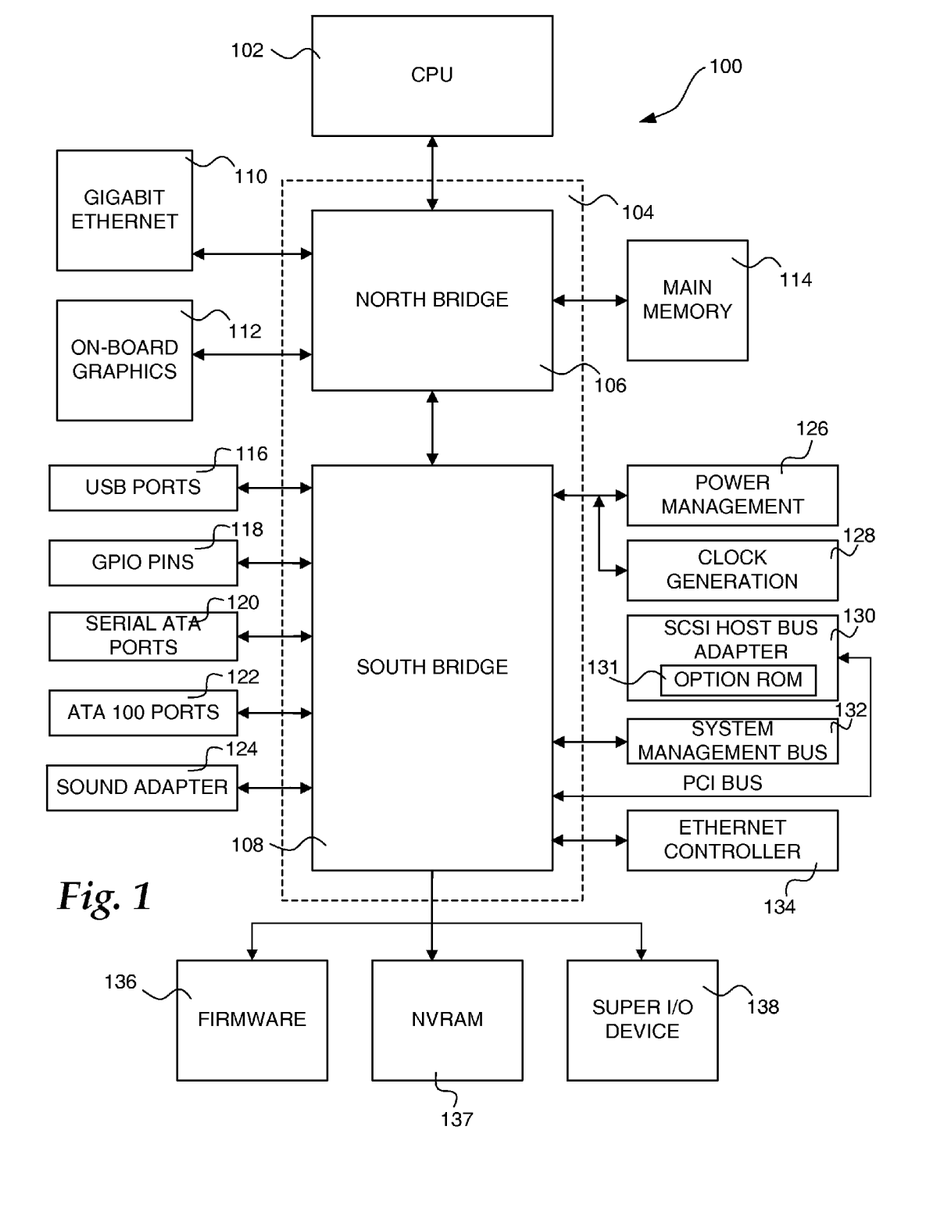
FIG. 1 is a computer architecture diagram showing aspects of a computer architecture utilized in the various embodiments of the invention.

FIG. 1 and the following discussion are intended to provide a brief, general description of a suitable computing environment in which the invention may be implemented. While the invention will be described in the general context of program modules that execute in conjunction with firmware such as BIOS and EFI firmware, those skilled in the art will recognize that the invention may also be implemented in combination with other types of program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to expedite initialization of the computer.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BBS compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The firmware 136 includes, but is not limited to, a BIOS 208 and/or an EFI firmware 204. Additional details regarding the operation of the EFI firmware 204 are provided below with respect to FIGS. 2-3. The LPC interface may also be utilized to connect a NVRAM 137 to the computer 100. In an embodiment of the present invention, the NVRAM 137 may be utilized by the firmware 136 to store configuration data for the computer 100. In further embodiments, the configuration data for the computer 100 may be stored on the same computer storage device as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
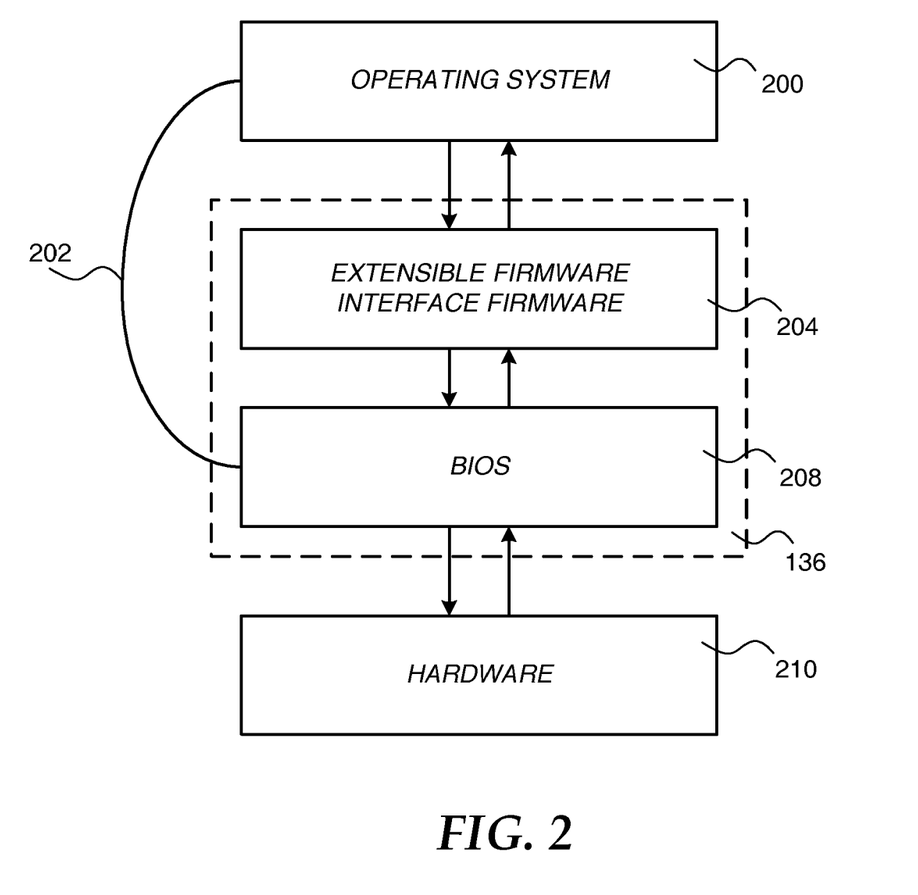
FIGS. 2 and 3 are computer hardware and software architecture diagrams illustrating aspects of an EFI environment that provides an operating environment for the various embodiments of the invention.

Referring now to FIG. 2, additional details regarding the operation of the EFI firmware 204 will be described. In an embodiment of the present invention, the firmware 136 comprises the EFI firmware 208 compatible with the EFI specification from INTEL CORPORATION. The EFI specification describes an interface between the operating system 200 and the EFI firmware 208. The EFI specification defines the interface that platform firmware must implement, and the interface that the operating system 200 may use in booting. How the EFI firmware 208 implements the interface is left up to the manufacturer of the EFI firmware 208. The intent of the specification is to define a way for the operating system 200 and the EFI firmware 208 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI firmware 204 and the BIOS 208 may be presented in the firmware 136. This allows users and system integrators to support both firmware interfaces. In order to provide this functionality, an interface 202 may be provided for use by legacy operating systems and applications. Moreover, additional details regarding the operation and architecture of EFI can be found in the EFI specification which is available from INTEL CORPORATION end expressly incorporated herein by reference. It should be appreciated that the firmware 136 may include only an EFI-compatible firmware or only a BIOS-compatible firmware. It should also be appreciated that the "EFI environment" referred to herein comprises the run-time environment provided by the firmware 136.

Figure 3:
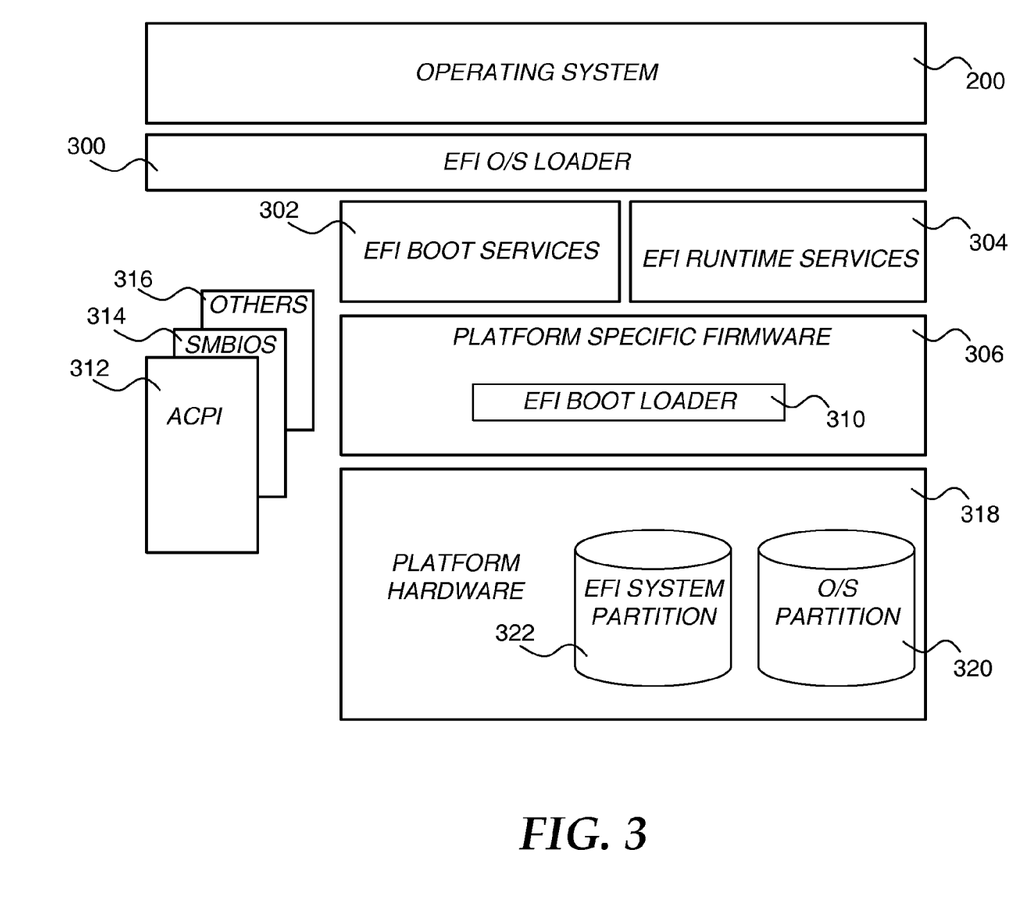

Turning now to FIG. 3, additional details regarding an EFI specification-compliant system utilized to provide an operating environment for the various embodiments of the invention will be described. As shown in FIG. 3, the system includes platform hardware 318 and an operating system 200. The platform specific firmware 306 may retrieve an OS image from the EFI system partition 322 using an EFI O/S loader 300. The EFI system partition 322 may be an architecturally shareable system partition. As such, the EFI system partition 322 defines a partition and file system that are designed to allow safe sharing of mass storage between multiple vendors. An O/S partition 320 may also be utilized.

Once started, the EFI O/S loader 300 continues to boot the complete operating system 200. In doing so, the EFI O/S loader 300 may use EFI boot services 302 and interfaces to other supported specifications to survey, comprehend, and initialize the various platform components and the operating system software that manages them. Thus, interfaces 312, 314, and 316, from other specifications may also be present on the system. For example, the Advanced Configuration and Power Management Interface ("ACPI") and the System Management BIOS ("SMBIOS") specifications may be supported.

EFI boot services 302 provides interfaces for devices and system functionality that can be used during boot time. EFI runtime services 304 may also be available to the O/S loader 300 during the boot phase. For example, a minimal set of runtime services may be presented to ensure appropriate abstraction of base platform hardware resources that may be needed by the operating system 200 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 310 at system boot time. The EFI boot loader 310 is a component in the EFI firmware that determines which program modules should be explicitly loaded and when. Once the EFI firmware is initialized, it passes control to the EFI boot loader 310. The EFI boot loader 310 is then responsible for determining which of the program modules to load and in what order.

Figure 4:
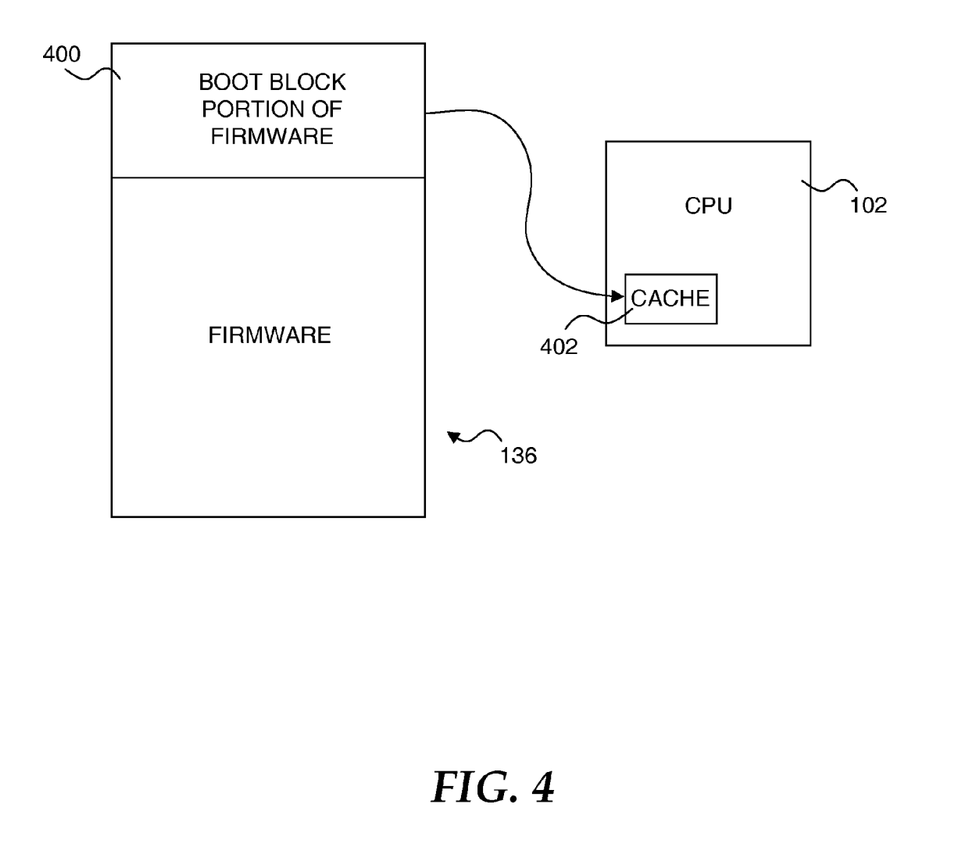
FIGS. 4 and 5 are software and hardware architecture diagrams utilized in embodiments of the invention for expediting initialization of a computing system.

Referring now to FIG. 4, further details regarding the operation of the firmware 136 utilized to provide an operating environment for the various embodiments of the invention will be provided. As shown in FIG. 4, the firmware 136 includes a boot block portion 400 for storing routines for performing a Power-on Self Test (POST). During the POST, the firmware 136 tests various system components such as the system main memory 114, the disk drives, and the keyboard to determine whether they are properly connected and operating before the firmware begins the actual boot of the system. In particular, the firmware 136 verifies and initializes the system main memory 114, initializes all system buses and devices, and identifies and selects which devices are available for booting during POST.

In conventional computing devices, the firmware 136 is accessed by the CPU 102 from the ROM or flash memory storing the firmware until the main memory 114 is initialized. Once the firmware 136 initializes the main memory 114, the firmware may be copied from the slower ROM or flash memory to the faster RAM used for the main memory 114 in order to speed up access time to the firmware, which is further described below in view of FIG. 5. Thus, in conventional computing devices, from the time the CPU 102 accesses the firmware 136 until the time the main memory 114 is initialized, the firmware is accessed from the slower ROM or flash memory storing the firmware.

In one embodiment of the present invention, a cache 402 is utilized to expedite the initialization of the computer 100 from the time the computer is powered on until the time the firmware 136 initializes the RAM used to store the main memory 114 and after the firmware is copied to the main memory. The cache 402 is a Level 1 ("L1") cache that is built into the architecture of the CPU 102. It is to be understood that the cache 402 may be a Level 2 ("L2") cache which is located between the CPU 102 and the main memory 114 and has a slower access time than a L1 cache. The cache 402 is a small, high speed static RAM (SRAM) storage mechanism that minimizes the number of outgoing transactions from the CPU 102 by sending information to and receiving information from the computer storage media of the computer 100 and passing this information to the CPU so that the CPU can do more work internally, thus speeding overall performance of the computer.

When data is written to the cache 402, the data must at some point be written to the main memory 114 as well. The timing of this write is controlled by what is known as the write policy. In one embodiment of the present invention, the cache 402 is a write-through cache. In a write-through cache, every write to the cache 402 causes a write to the main memory 114. In an alternative embodiment, the cache may be a write-back cache. In a write-back cache, writes are not immediately mirrored to the main memory 114. Instead, the cache 402 tracks which of the locations in the cache have been written over, and the data in these locations is written back to the main memory 114 when that data is evicted from the cache.

In one embodiment of the present invention, the cache 402 is operative to store POST instructions associated with the firmware 136 stored on the ROM or flash memory that have not yet been executed by the CPU 102. Once the POST instructions are cached to the cache 402, the CPU 102 can access the POST instructions, when needed, from the cache instead of from the ROM or flash memory storing the firmware 136. Before the CPU 102 requests the POST instructions from the ROM or flash memory, the CPU will check with the cache 402 to determine if the instructions have been stored in the cache. If the desired instructions are stored in the cache 402, then the CPU 102 will access the instructions from the cache instead of from the ROM or flash memory storing the firmware 136. Since the cache 402 is located on the CPU 102, the CPU 102 can access the instructions from the cache faster than the CPU can access the same instructions from the ROM or flash memory connected to the south bridge 108 via the LPC interface. Moreover, since the cache 402 is a high-speed SRAM, the access time of the cache is significantly faster than the access time of the ROM or flash memory storing the firmware 136.

Figure 5:
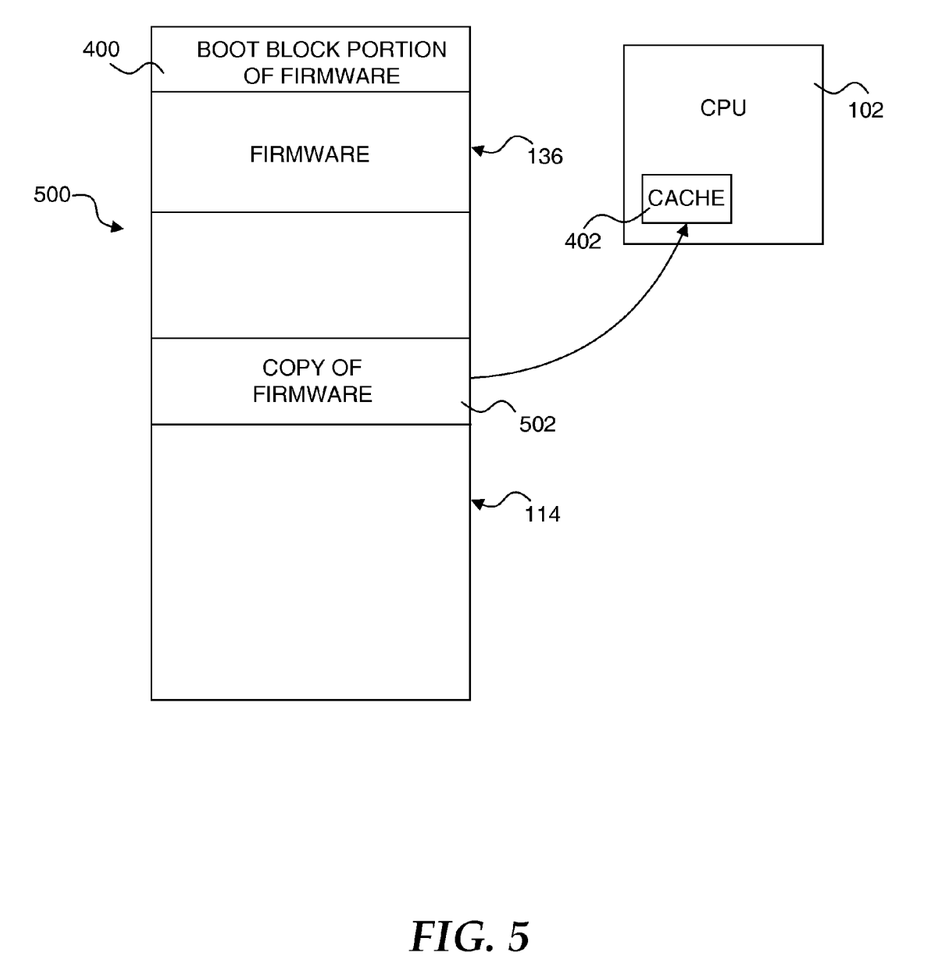

As is known in the art, when the computer 100 is powered on, the CPU 102 begins executing at the memory address ffff_fff0, which is the address associated with the beginning of the firmware 136 stored in the ROM or flash memory. As is illustrated in FIG. 5, the ROM or flash memory storing the firmware 136 is mapped to the top of an address space 500 which includes the ROM or flash memory storing the firmware 136 and the RAM used for the main memory 114. In an embodiment of the present invention, the firmware 136 includes instructions near the start of the firmware instructions that direct the CPU 102 to cache a range of memory addresses corresponding to the boot block portion 400 of the firmware to the cache 402. For example, if the address space 500 covers 4 gigabytes ("GB") of memory and the size of the boot block portion 400 of the firmware 136 is 128 kilobytes ("KB"), then the firmware instructs the CPU 102 to cache from 4 GB-128 KB to 4 GB to the cache 402. In particular, the firmware 136 instructs the CPU 102 to cache the instructions from the bottom of the boot block portion 400 of the firmware to the top of the boot block portion. An example of the code used to create these instructions is illustrated in Table 1.

TABLE 1

Program 4 GB - 128 KB to 4 GB as WT memory
    Mov    ecx, 200h
    Mov    eax, 00fffE0004h
    Mov    edx, 0
    Wrmsr
    Mov    ecx, 201h
    Mov    eax, 0fffE0800h
    Mov    edx, 0fh
    Wrmsr
Enable MTRRs
    Mov    ecx, 02FFh
    Rdmsr
    Or    eax, 0800h
    Wrmsr
Enable CPU cache
    Mov    eax, cr0
    And    eax, 09FFFFFFFh
    Mov    cr0, eax Once the CPU 102 caches the boot block portion 400 of the firmware 136 associated with the range of addresses provided by the firmware to the cache 402, the CPU 102 executes the POST routines of the boot block portion from the cache instead of from the ROM or flash memory. As discussed above, since the cache 402 is a high-speed SRAM, the CPU 102 is able to execute the POST instructions from the cache significantly faster than from the ROM or flash memory, causing the time to initialize the computer 100 to reduce. The CPU 102 continues to execute the POST routines of the firmware 136 from the cache 402 until the RAM used for the main memory 114 is initialized.

Once the main memory 114 is initialized, the entire firmware 136 is copied, and the copy of the firmware 502 is stored in a portion of the main memory, as illustrated in FIG. 5. In an embodiment of the present invention, once the firmware 136 is copied into a portion of the main memory 114, the CPU 102 is instructed by the firmware to cache a range of memory addresses associated with the copy of the firmware 502 stored in the main memory to the cache 402. Since the cache 402 is a high-speed SRAM, the CPU 102 is able to execute the firmware 136 from the cache faster than from the RAM used for the main memory 114, further decreasing the time needed to initialize the computer 100. Additional details regarding the processes provided herein for expediting the initialization of the computer 100 are provided below with respect to FIGS. 7A-7B.

Figure 6:
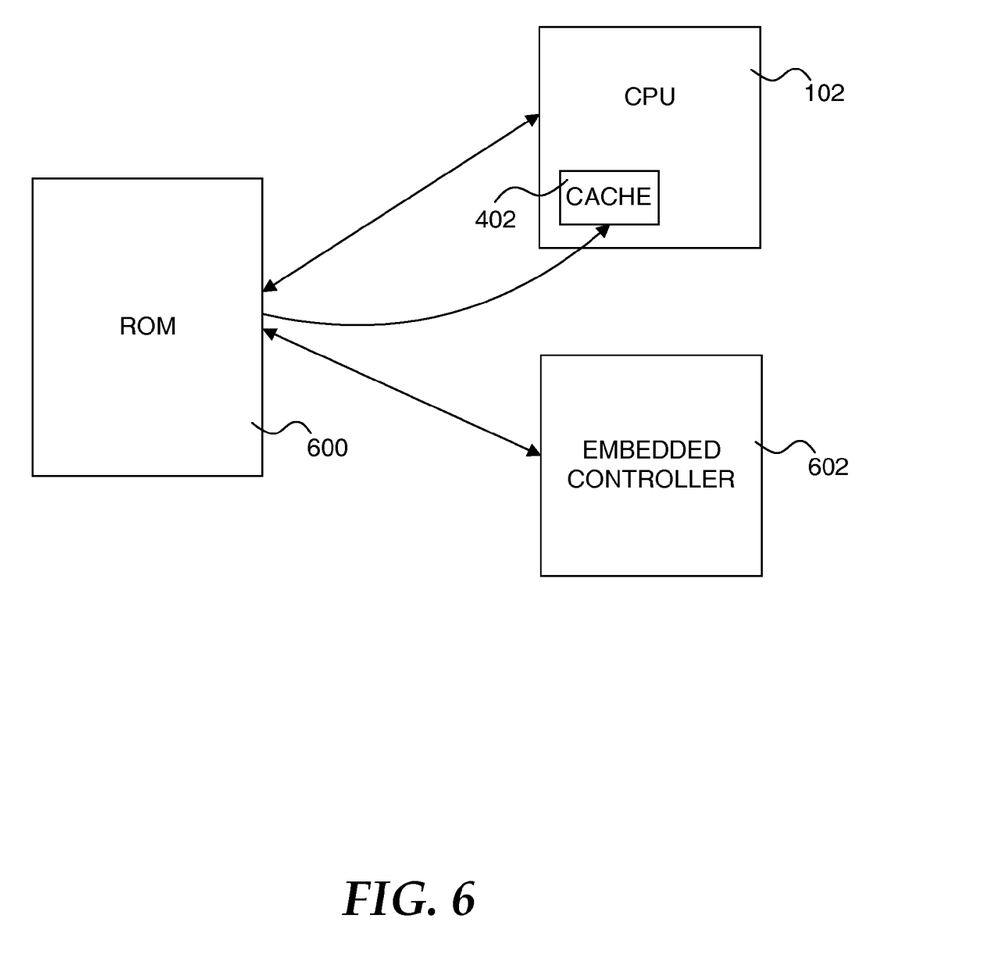
FIG. 6 is a software and hardware diagram showing an architecture utilized in embodiments of the invention for increasing the amount of time multiple devices have to access a computer storage media.

Referring now to FIG. 6, another embodiment of the present invention will be provided. When the CPU 102 and at least one other device, such as an embedded controller 602, in a computing device are both accessing a single computer storage media, such as a ROM 600, one device has to wait while the other device is accessing the ROM. In an embodiment of the present invention, during times when neither of the devices 102, 602 is accessing the ROM 600, firmware associated with the computing device instructs the CPU to read ahead instructions stored on the ROM and cache the instructions to the cache 402 prior to executing the instructions. Once the instructions are cached to the cache 402, the CPU 102 can execute the instructions from the cache instead of from the ROM 600 while the embedded controller 602 accesses instructions from the ROM 600. Therefore, the embedded controller 602 is allowed more time to access the ROM 600. The embedded controller 602 may perform peripheral control including, but not limited to, battery management, power management, or lid open/close management.

Figure 7A:
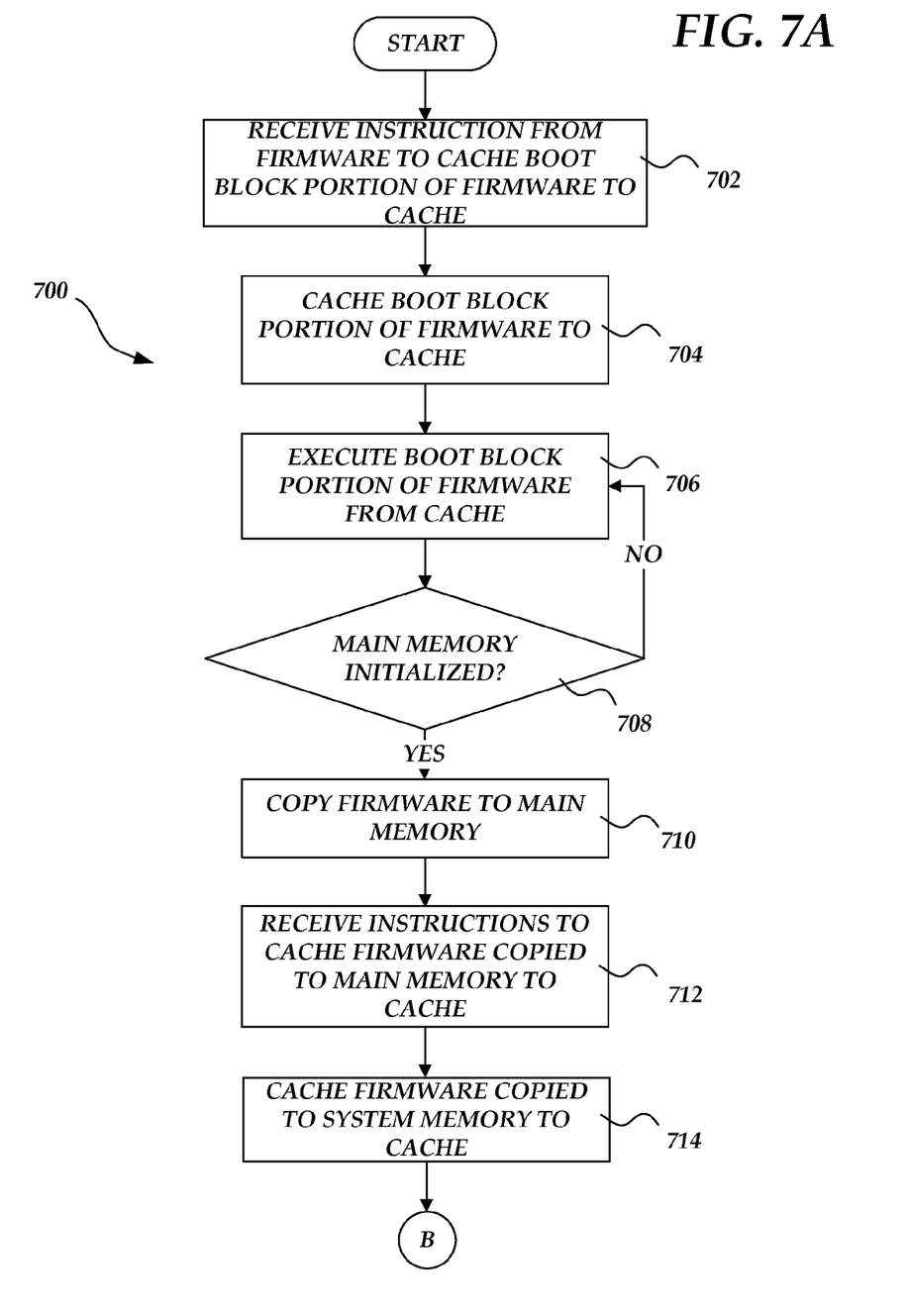
FIGS. 7A-7B are flow diagrams illustrating aspects of a process provided by embodiments of the invention for expediting initialization of a computing system.
Figure 7B:
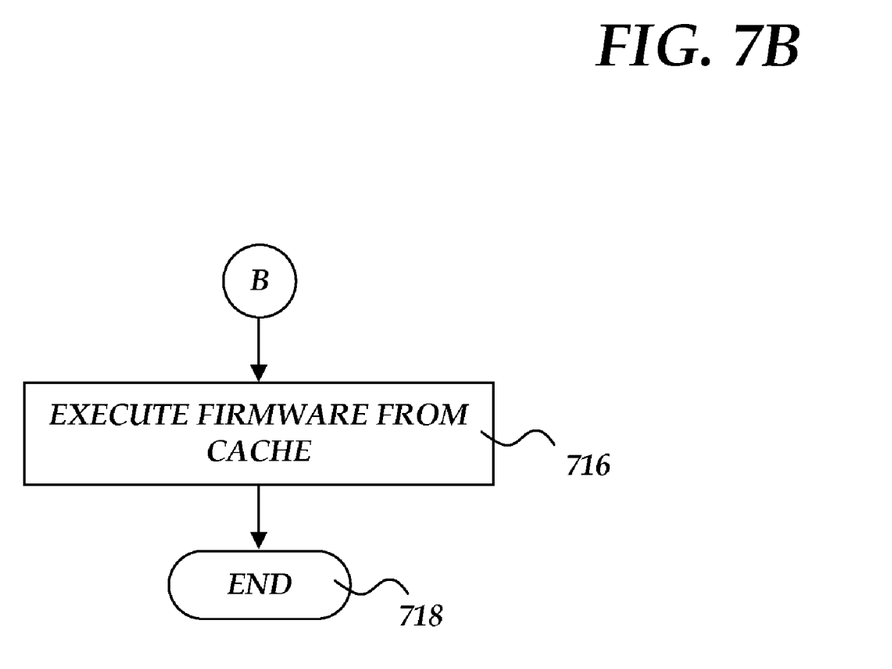

Turning now to FIGS. 7A-7B, an illustrative routine 700 will be described illustrating a process for expediting initialization of the computer 100. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 7A-7B and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 700 begins at operation 702, where the CPU 102 receives instructions from the firmware 136 to cache a range of memory addresses corresponding to the location of the boot block portion 400 of the firmware on the ROM or flash memory to the cache 402. As discussed above, the instructions to cache the boot block portion 400 of the firmware 136 are located near the beginning of the instructions provided to the CPU 102 by the firmware.

Once the CPU 102 receives these caching instructions from the firmware 136, the routine 700 continues to operation 704, where the CPU 102 caches the boot block portion 400 of the firmware to the cache 402. In particular, the CPU 102 reads ahead the firmware instructions corresponding to the range of memory addresses provided by the firmware 136 and caches the instructions to the cache 402 prior to executing the instructions. As discussed above, the boot block portion 400 of the firmware 136 includes the routines associated with the POST.

When the boot block portion 400 of the firmware 136 is cached to the cache 402, the routine 700 proceeds to operation 706, where the CPU 102 begins executing the boot block portion 400 of the firmware 136 from the cache. In particular, prior to accessing the ROM or flash memory storing the firmware 136 for needed instructions, the CPU 102 first checks with the cache 402 to determine if the needed instructions are stored on the cache. If the instructions are stored on the cache 402, then the CPU 102 accesses the cache for the instructions in place of accessing the ROM or flash memory storing the firmware 136 for the instructions. Since the access time for the cache 402 is significantly less than the access time for the ROM or flash memory storing the firmware 136, the time to initialize the computer 100 is decreased. If the instructions are not stored on the cache 402, then the CPU 102 accesses the ROM or flash memory storing the firmware 136 for the instructions.

From operation 706, the routine proceeds to operation 708, where the firmware 136 determines whether the RAM used for the main memory 114 has been initialized. During POST, the firmware 136 tests and initializes a number of system components including the main memory 114. If a determination is made that the main memory 114 has not been initialized, then the routine 700 returns back to operation 706, where the CPU 102 continues to execute the boot block portion 400 of the firmware 136 from the cache 402. On the other hand, if a determination is made that the main memory 114 has been initialized, then the routine 700 continues to operation 710.

At operation 710, the firmware 136 is copied, and the copy of the firmware 502 is stored in a portion of the RAM used for the main memory 114 so that the CPU 102 can execute the firmware from the main memory 114. From operation 710, the routine 700 proceeds to operation 712, where the CPU 102 receives instructions from the firmware 136 to disable caching for the ROM or flash memory storing the firmware and to enable caching for the copy of the firmware 502 stored in the main memory 114. In particular, the firmware 136 instructs the CPU 102 to cache a range of memory addresses corresponding to the location of the copy of the firmware 502 stored in the main memory 114 to the cache 402.

In response to receiving instructions from the firmware 136 to cache the range of memory addresses corresponding to the location of the copy of the firmware 502, the routine 700 proceeds to operation 714, where the CPU 102 reads ahead the firmware instructions corresponding to the range of memory addresses provided by the firmware 136 and caches the instructions to the cache 402 prior to executing the instructions.

When the copy of the firmware 502 is cached to the cache 402, the routine 700 proceeds to operation 716, where the CPU 102 begins executing the firmware 136 from the cache. In particular, prior to accessing the copy of the firmware 502 stored in the main memory 114 for needed instructions, the CPU 102 first checks with the cache 402 to determine if the needed instructions are stored on the cache. If the instructions are stored on the cache 402, then the CPU 102 accesses the cache for the instructions in place of accessing the main memory 114 for the instructions. Since the access time for the cache 402 is less than the access time for the main memory 114 storing the copy of the firmware 502, the time to initialize the computer 100 is again decreased. If the instructions are not stored on the cache 402, then the CPU 102 accesses the main memory 114 for the instructions. From operation 716, the routine 700 continues to operation 718, where it ends.

Figure 8:
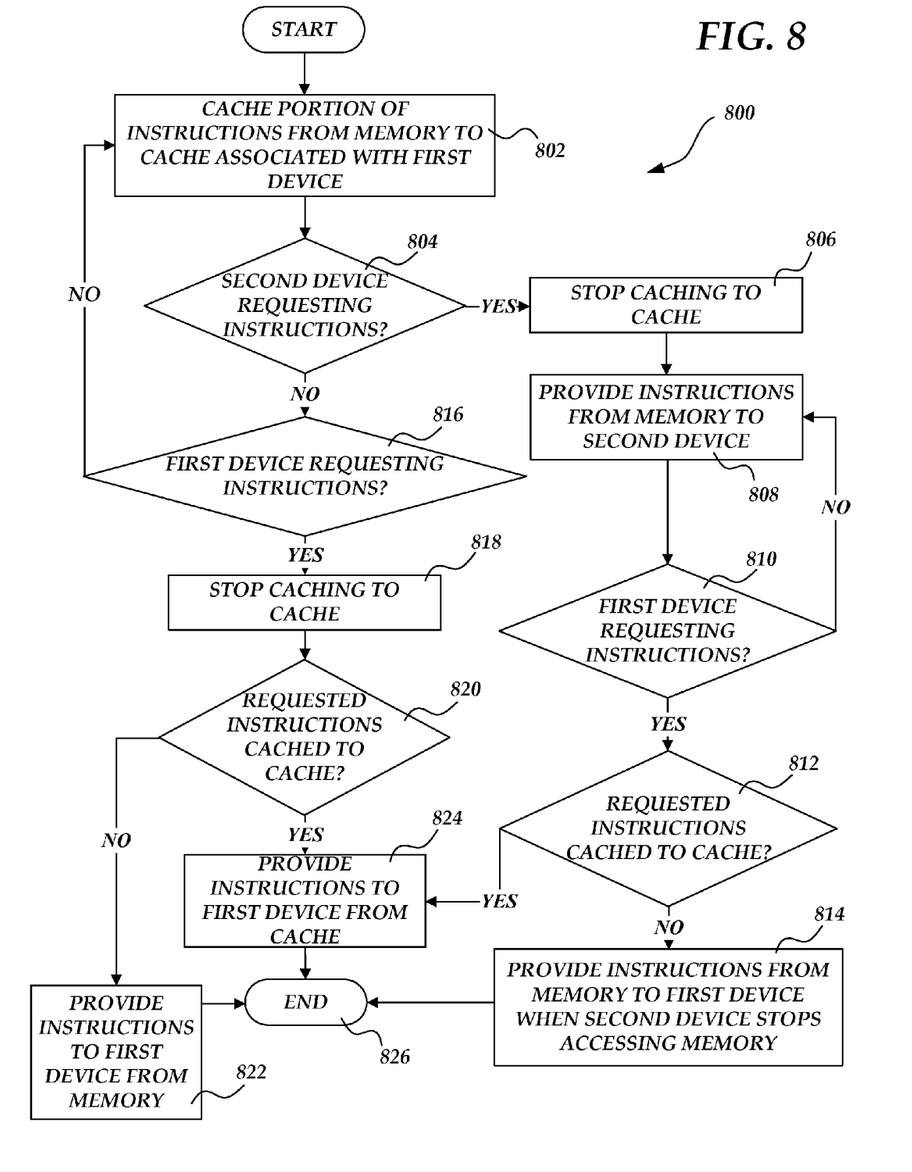
FIG. 8 is a flow diagram illustrating aspects of a process provided by embodiments of the invention for increasing the amount of time multiple devices have to access a computer storage media.

Turning now to FIG. 8, an illustrative routine 800 will be described illustrating a process for increasing the amount of time multiple devices 102, 602 have to access a computer storage media, such as the ROM 600. The routine 800 begins at operation 802, where a portion of the instructions stored on the ROM 600 is cached to the cache 402 associated with the CPU 102. As discussed above, when neither the CPU 102 nor the embedded controller 602 is accessing the ROM 600, the CPU 102 caches instructions stored on the ROM to the cache 402 associated with the CPU.

From operation 802, the routine 800 proceeds to operation 804, where a determination is made whether the embedded controller 602 is requesting instructions stored on the ROM 600. If a determination is made that the embedded controller 602 is requesting instructions stored on the ROM 600, the routine 800 proceeds to operation 806, where the CPU 102 ceases caching instructions stored on the ROM to the cache 402. The routine 800 then proceeds to operation 808, where the requested instructions stored on the ROM 600 are provided to the embedded controller 602. From operation 808, the routine 800 proceeds to operation 810, where a determination is made whether the CPU 102 is requesting instructions stored on the ROM 600. If the CPU 102 is not requesting instructions stored on the ROM 600, then the routine 800 proceeds back to operation 808, where the embedded controller 602 continues to receive the requested instructions stored on the ROM.

On the other hand, if the CPU 102 is requesting instructions stored on the ROM 600, then the routine 800 proceeds from operation 810 to operation 812, where a determination is made whether the requested instructions originally stored on the ROM have been cached to the cache 402. In particular, before the CPU 102 requests the instructions from the ROM 600, the CPU will check with the cache 402 to determine if the instructions have been stored in the cache. If the requested instructions have been cached to the cache 402, then the routine 800 proceeds from operation 812 to operation 824, where the requested instructions are provided to the CPU 102 from the cache 402 instead of from the ROM 600. From operation 824, the routine 800 continues to operation 826, where it ends.

However, if at operation 812 a determination is made that the requested instructions have not been cached to the cache 402, then the routine 800 proceeds to operation 814, where the requested instructions are provided to the CPU 102 from the ROM 600 when the embedded controller 602 stops accessing the ROM 600. When multiple devices 102, 602 are both accessing a single ROM 600, the CPU must wait to access the ROM until the embedded controller has finished accessing the ROM if the requested instructions have not been cached to the cache 402. From operation 814, the routine 800 continues to operation 826, where it ends.

Returning to operation 804, if a determination is made that the embedded controller 602 is not requesting instructions from the ROM 600, then the routine 800 proceeds from operation 804 to operation 816, where a determination is made whether the CPU 102 is requesting instructions stored on the ROM. If the CPU 102 is not requesting instructions stored on the ROM 600, then the routine 800 proceeds back to operation 802, where a portion of the instructions stored on the ROM continue to be cached to the cache 402.

On the other hand, if at operation 816 a determination is made that the CPU 102 is requesting instruction stored on the ROM 600, then the routine 800 proceeds to operation 818, where the CPU 102 ceases caching instructions stored on the ROM to the cache 402. The routine 800 then proceeds to operation 820, where a determination is made whether the requested instructions have been cached to the cache 402. In particular, before the CPU 102 requests the instructions from the ROM 600, the CPU will check with the cache 402 to determine if the instructions have been stored in the cache. If the requested instructions have been cached to the cache 402, then the routine 800 proceeds from operation 820 to operation 824, where the requested instructions are provided to the CPU 102 from the cache 402 instead of from the ROM 600. From operation 824, the routine 800 continues to operation 826, where it ends.

However, if the requested instructions have not been cached to the cache 402, then the routine 800 proceeds from operation 820 to operation 822, where the requested instructions are provided to the CPU 102 from the ROM 600. From operation 822, the routine 800 continues to operation 826, where it ends.

It will be appreciated that embodiments of the present invention provide methods, systems, apparatus, and computer-readable medium for expediting initialization of a computing system. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer storage medium having computer-executable instructions stored thereon that, when executed by a computer, cause the computer to:
    cache a portion of instructions from a memory to a cache associated with a first device;
    while caching the portion of instructions from the memory, determine that a second device is requesting instruction stored in the memory;
    upon determining that the second device is requesting the instructions from the memory, cease caching the portion of instructions from the memory to the cache;
    access the instructions from the memory with the second device; and
    while accessing the instructions from the memory with the second device, access the cached portion of instructions from the cache with the first device.

2. The computer storage medium of claim 1, wherein the first device is a central processing unit (CPU) of the computer.

3. The computer storage medium of claim 1, wherein the second device is an embedded controller.

4. The computer storage medium of claim 1, wherein the memory comprises a read-only memory ("ROM") or flash memory containing a firmware for the computer.

5. The computer storage medium of claim 4, wherein the firmware comprises a Basic Input/Output System ("BIOS").

6. The computer storage medium of claim 4, wherein the firmware is compatible with the Extensible Firmware Interface ("EFI") specification.

7. A method for increasing the amount of time multiple devices have to access instruction on a shared computer storage medium, the method comprising executing instructions on a computer to perform the operations of:
- caching a portion of instructions from the shared computer storage medium to a cache associated with a first device;
- while caching the portion of instructions from the shared computer storage medium, determining that a second device is requesting instruction stored in the shared computer storage medium;
- upon determining that the second device is requesting instructions from the shared computer storage medium, ceasing caching the portion of instructions from the shared computer storage medium to the cache;
- access the instructions from the shared computer storage medium with the second device; and
- while accessing the instructions from the shared computer storage medium with the second device, access the cached portion of instructions from the cache with the first device.

8. The method of claim 7, wherein the first device is a CPU of the computer.

9. The method of claim 7, wherein the second device is an embedded controller.

10. The method of claim 7, wherein the shared computer storage medium comprises a ROM or flash memory containing a firmware for the computer.

11. The method of claim 10, wherein the firmware comprises a BIOS.

12. The method of claim 10, wherein the firmware is compatible with the EFI specification.

13. A system for increasing the amount of time multiple devices have to access instructions on a shared computer storage medium, the system comprising:
- the shared computer storage medium containing the instructions for execution during an initialization of a computer system;
- a first device in the computer system configured to read the instructions from the shared computer storage medium and execute the instructions during the initialization of the computer system; and
- a second device in the computer system having an associated cache and configured to
  - determine that neither the first device nor the second device is accessing the instructions from the shared computer storage medium,
  - upon determining that neither the first device nor the second device is accessing the instructions from the shared computer storage medium, cache a portion of the instructions from the shared computer storage medium to the cache associated with the second device, and
  - during the initialization of the computer system, access the cached portion of the instructions from the cache associated with the second device while the first device accesses the instructions from the shared computer storage medium.

14. The system of claim 13, wherein the first device is an embedded controller.

15. The system of claim 13, wherein the second device is a CPU of the computer system.

16. The system of claim 13, wherein the shared computer storage medium comprises a ROM or flash memory containing a firmware for the computer system.

17. The system of claim 16, wherein the firmware comprises a BIOS.

18. The system of claim 16, wherein the firmware is compatible with the EFI specification.

* * * * *